United States Patent [19]
Tolnai

[11] 3,865,139
[45] Feb. 11, 1975

[54] APPLIANCE SHUTOFF VALVE
[75] Inventor: Julius L. Tolnai, Los Angeles, Calif.
[73] Assignee: Price Pfister Brass Mfg. Co., Pacoima, Calif.
[22] Filed: Aug. 24, 1973
[21] Appl. No.: 391,238

[52] U.S. Cl. ............................. 137/625.19, 251/175
[51] Int. Cl. .............................................. F16k 5/04
[58] Field of Search ................ 137/625.19, 625.41; 251/175

[56] References Cited
UNITED STATES PATENTS
| | | | |
|---|---|---|---|
| 1,035,472 | 8/1912 | Rogge | 137/625.41 |
| 1,896,092 | 2/1933 | Mangiameli | 137/625.19 X |
| 3,098,506 | 7/1963 | Spragens | 137/625.19 |
| 3,661,181 | 5/1972 | Palmer et al. | 251/175 X |

Primary Examiner—Robert G. Nilson
Attorney, Agent, or Firm—Flam & Flam

[57] ABSTRACT

The shutoff valve comprises a valve body having outwardly facing axially aligned cups each receiving a hollow valve cage upon which a sealing member is peripherally mounted. The sealing member forms an expansible pressure chamber communicating on the outside with an inlet, and on its inside with a spool fitted into the cage. The angular position of the spool determines either a sealed or an open position of the pressure chamber. The spools are connected together for movement in unison.

2 Claims, 10 Drawing Figures

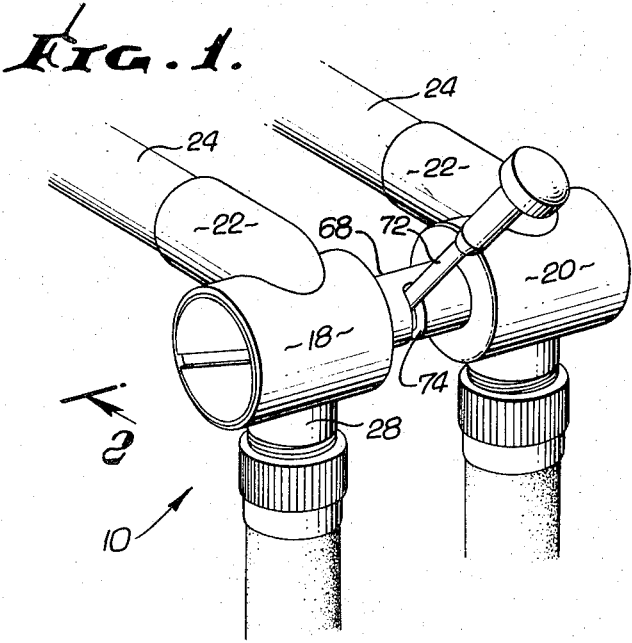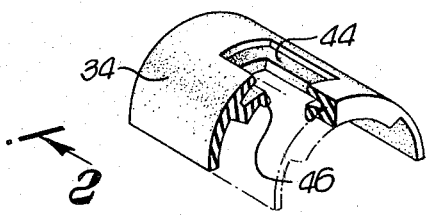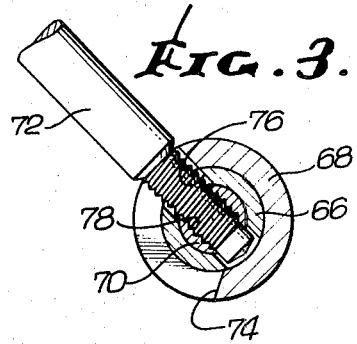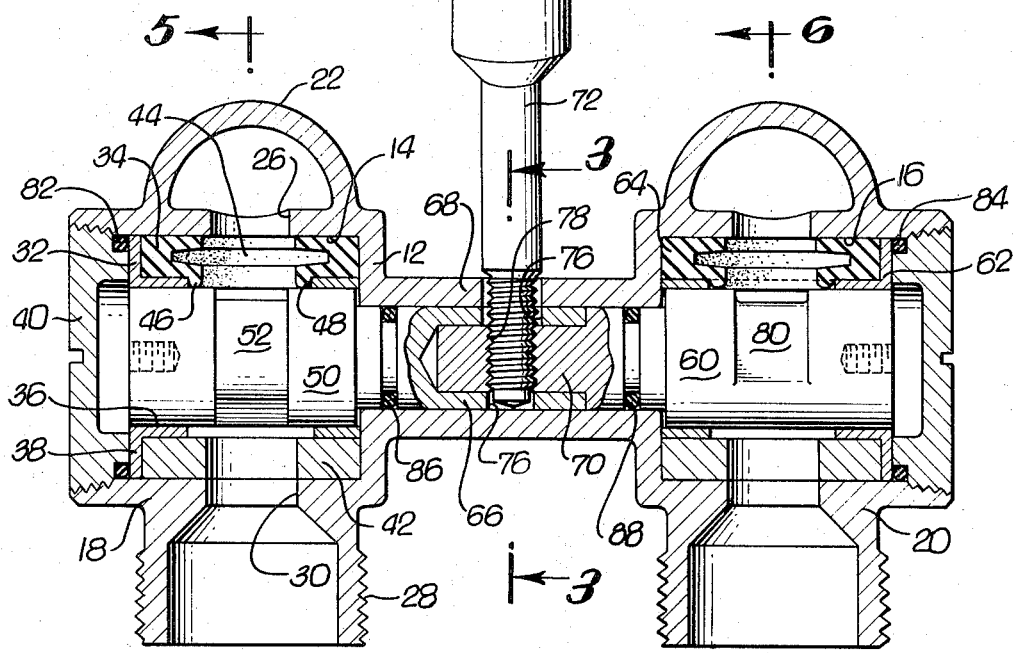

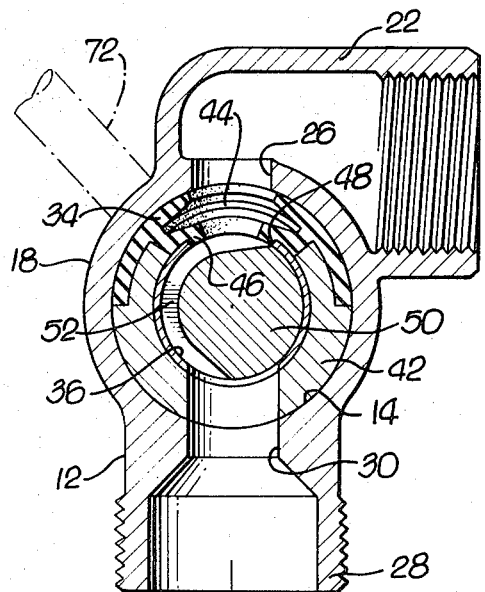
Fig. 5.
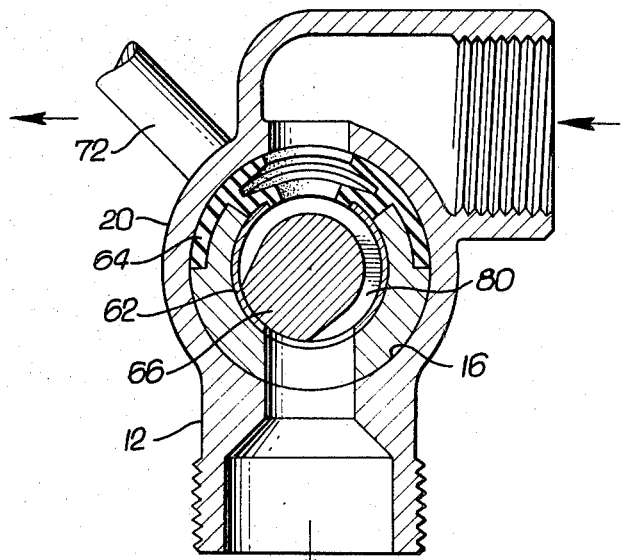
Fig. 6.
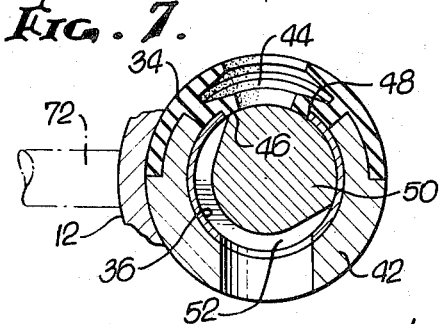
Fig. 7.
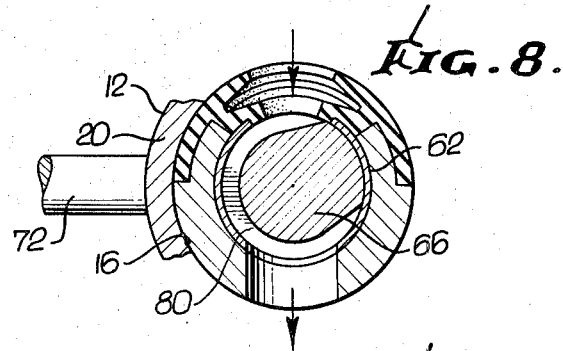
Fig. 8.
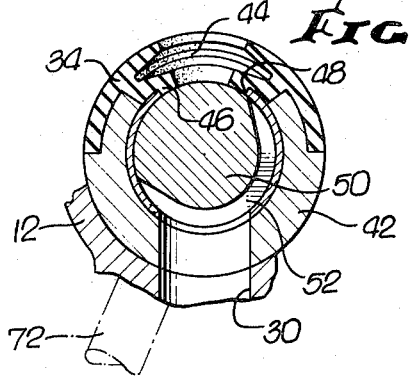
Fig. 9.
Fig. 10.

APPLIANCE SHUTOFF VALVE

FIELD OF INVENTION

This invention relates to fluid handling, and more particularly to a shutoff valve structure for appliances serviced by hot and cold water hoses.

BACKGROUND OF THE INVENTION

Portable dishwashers, washing machines and other appliances serviced by hot and cold water hoses present a flood hazard if the hoses remain subject to pressurized water while the appliances are shut down and not in use. Conventional shutoff valves in practice are not closed after the appliance is turned off because the operation, simple though it may be, is regarded as cumbersome. One object of this invention is to provide a single handled shutoff valve easily moved from off to an established set position.

Appliances such as portable dishwashers and washing machines often require adjustment of the relative opening of hot and cold water valves in order to achieve proper operation of the appliance. Such adjustments have often required the services of skilled personnel. Another object of this invention is to provide a simple single handled shutoff valve easily adjustable to determine the flow conditions to hot and cold water hoses or conduits to household appliances.

SUMMARY OF THE INVENTION

In order to accomplish the foregoing objects, I provide two ganged valves. Each of the valves includes a spool that has relieved portions that upon angular movement, establish flow paths around the spool and to the appliance. The flow passage is defined by a seal member of the type shown and described in United States letters Patent No. 3,661,181 issued May 9, 1972 and entitled LIP SEALING MIXING VALVE FOR LAVATORIES, SINKS, ETC.

BRIEF DESCRIPTION OF THE DRAWINGS

A detailed description of the invention will be made with reference to the accompanying drawings wherein like numerals designate corresponding parts in the several figures.

FIG. 1 is a front perspective view of a shutoff valve incorporating the present invention.

FIG. 2 is an enlarged longitudinal sectional view taken along a plane corresponding to line 2—2 of FIG. 1.

FIG. 3 is a transverse sectional view showing the handle connection and taken along a plane corresponding to line 3—3 of FIG. 2.

FIG. 4 is a perspective view of a flexible valve member.

FIGS. 5 and 6 are transverse sectional views taken along planes corresponding to lines 5—5 and 6—6 of FIG. 2 and showing the valves in open positions.

FIGS. 7 and 8 are partial sectional views corresponding to FIGS. 5 and 6, but illustrating an intermediate position in which only one of the companion valves is open.

FIGS. 9 and 10 are views similar to FIGS. 5 and 6 but showing both valves closed.

DETAILED DESCRIPTION OF THE PREFERRED EMBODIMENT

The following detailed description is the best presently contemplated mode of carrying out the invention. This description is not to be taken in a limiting sense, but is made merely for the purpose of illustrating the general principles of the invention since the scope of the invention is best defined by the appended claims.

The valve structure 10 as shown in FIGS. 1 and 2 includes a body 12 that may be made of cast brass or other suitable material. The body has two cylindrical control chambers 14 and 16 formed by outwardly facing axially aligned cup parts 18 and 20. Each cup has an inlet and an outlet communicating via the corresponding control chamber.

Thus the cup 18 has a fitting 22 threadedly receiving a nipple 24 to which hot water is supplied. The fitting opens into the top side of the cup by the aid of an inlet port 26 (FIG. 2). The bottom side of the cup has a hose bib part 28 that communicates with the opposite side of the chamber by the aid of an outlet port 30.

A cage 32 fits into the cup to support the seal member 34 thereon. The cage has a tubular part 36 bounded at the outer end by a flange 38 that fits the chamber 14. The inner end of the tubular part abuts the bottom of the cylindrical chamber 14 and is held in place by a threaded cap screw 40.

The seal member (see also FIG. 4) extends arcuately in the angular space between the chamber 14 and the tubular cage part 36. Ribs on the cage interfit the seal member to hold it in position. The seal member extends about half way around the cage. The other half carries a spacer 42. The seal member has inner and outer wall parts defining a pressure chamber 44 therebetween communicating with the inlet 26. The inner wall part has a bead or boss 46 that extends into an opening 48 of the cage. A spool 50 fits into the cage and provides a peripheral surface cooperable with the bead 46. Thus the exterior surface of the spool has a channel 52 (see also FIG. 5) that has spaced ends respectively merging into the cylindrical periphery of the spool. When the channel is opposed to the bead, communication is established from the inlet port 26 to the outlet port 30 via the channel. When the spool is moved (FIGS. 7 and 9) to shift the channel 52 out of alignment, the bead contacts the periphery of the spool, and the inlet 48 is sealed. Pressure in the chamber 44 urges the bead into sealing relationship with the spool. Between full open (FIG. 5) and full closed (FIG. 7 or FIG. 9), the channel can provide a restricted passage as by partially uncovering the port 48.

The cold water control chamber 16 is similarly provided with a spool 60, cage 62, seal member 64, etc. One of the spools, in this instance the hot water spool 50, has a hollow reduced extension 66 that fits into a connection portion 68 of the body. The other spool 60 has a stem 70 that fits into the hollow extension 66. A handle 72 extends through a slot 74 (FIG. 1) in the connecting portion 68, through diametric holes 76 in the spool extension 66 threadedly to engage a hole 78 in the companion spool stem 70. The spools are thereby locked together for conjoint angular movement (FIG. 3).

The cold water spool 66 has its control channel 80 arranged in offset relationship to the hot water control channel 52. Accordingly, extreme positions of the handle correspond respectively to open position of both valves (FIGS. 5 and 6) and closed positions of both valves (FIGS. 9 and 10). When the handle is moved from the position illustrated in FIGS. 1, 5 and 6, intermediate mixes are obtained.

The spools may readily be fabricated, as by molding techniques. Different timing arrangements can be provided merely by substituting different spools for use in pairs. The handle 72 is very easily moved to its off position, determined by an end of the slot 74, and to any intermediate position which may be marked alongside the slot 74.

The body is readily sealed by O-rings 82 and 84 carried by the caps, and by O-rings 86 and 88 mounted at the bases of the telescoping parts of the spools.

Intending to claim all novel, useful and unobvious features shown or described, I make the following claims:

1. In a shutoff valve for an appliance utilizing hot and cold water hoses:
   a. a valve body having outwardly facing cups located in axial alignment, and a hollow connecting portion therebetween;
   b. means forming diametrically disposed inlet and outlet ports to each cup;
   c. a hollow cage in each cup;
   d. a sealing member mounted peripherally of each cage, each sealing member having an outer wall and an inner wall, forming a pressure chamber therebetween communicating with the corresponding inlet, said inner wall having a bead projecting into an opening of the cage to be exposed at the hollow interior of said cage;
   e. a pair of spools fitting the cages respectively, and having inner ends fitted to each other and to a handle projecting radially of the common axis of the spools, said spools having arcuately extending channels opposed to said beads, said spools also having surfaces beyond the ends of said channels for engagement by said beads for sealing of said chambers from said outlets;
   f. said channels of said spools being so arrayed relative to said beads that the angular position of said handle determines the flow characteristics of hot and cold water to said appliance.

2. The combination as set forth in claim 1 in which said valve body has a reduced connecting portion between said cups, there being a slot in said reduced connecting portion for passage of said handle; said spools having parts overlapping at the region of said reduced connection portion; said handle being detachably engaged with said overlapping parts to secure said spools for angular movement in unison.

* * * * *